March 17, 1942.　　M. MARTENSSON　　2,276,326
FLUID HEAT EXCHANGE APPARATUS
Filed April 19, 1939　　5 Sheets-Sheet 1

INVENTOR.
Marten Martensson
BY
Rollin M. Holbrook
ATTORNEY.

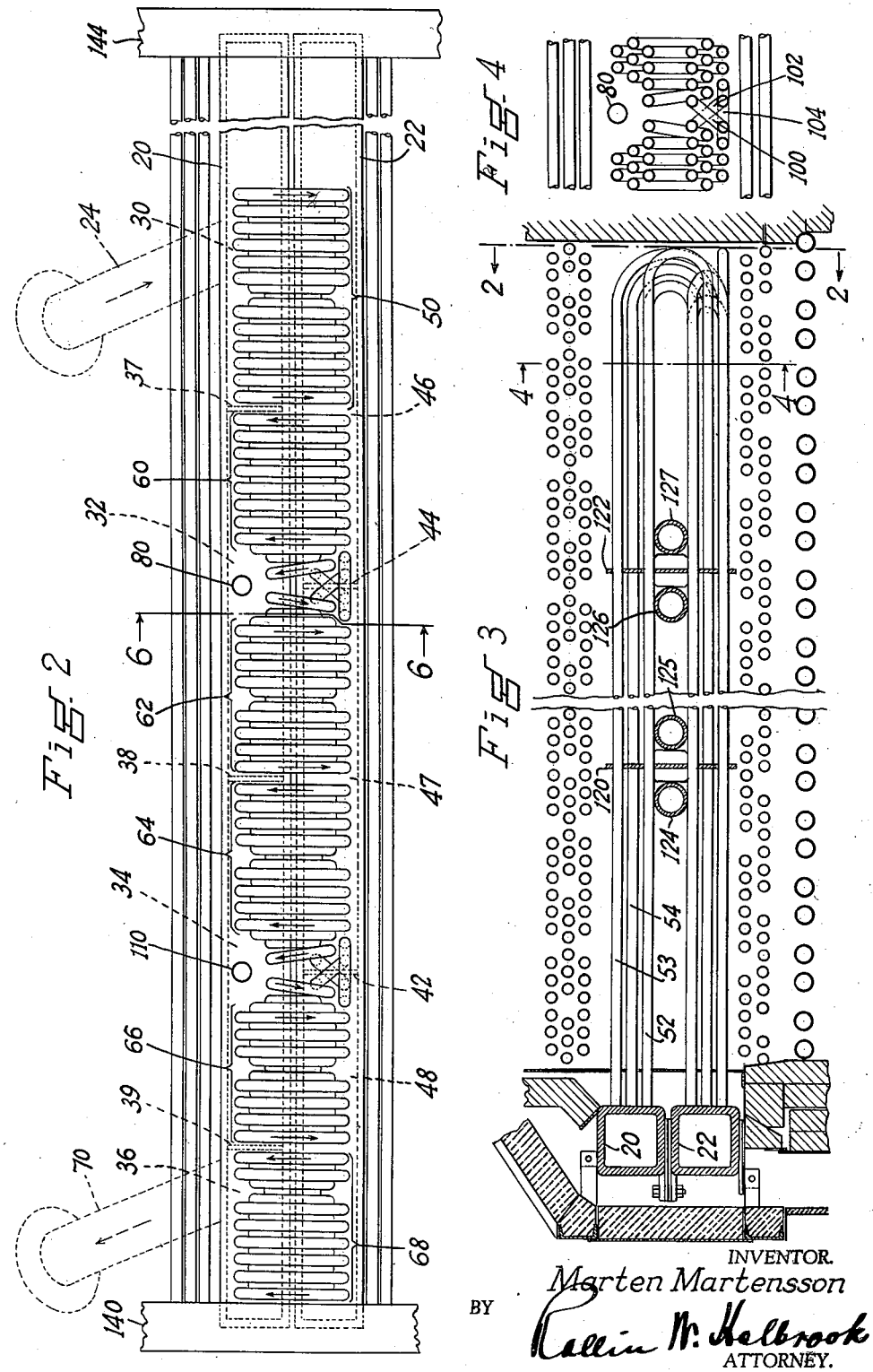

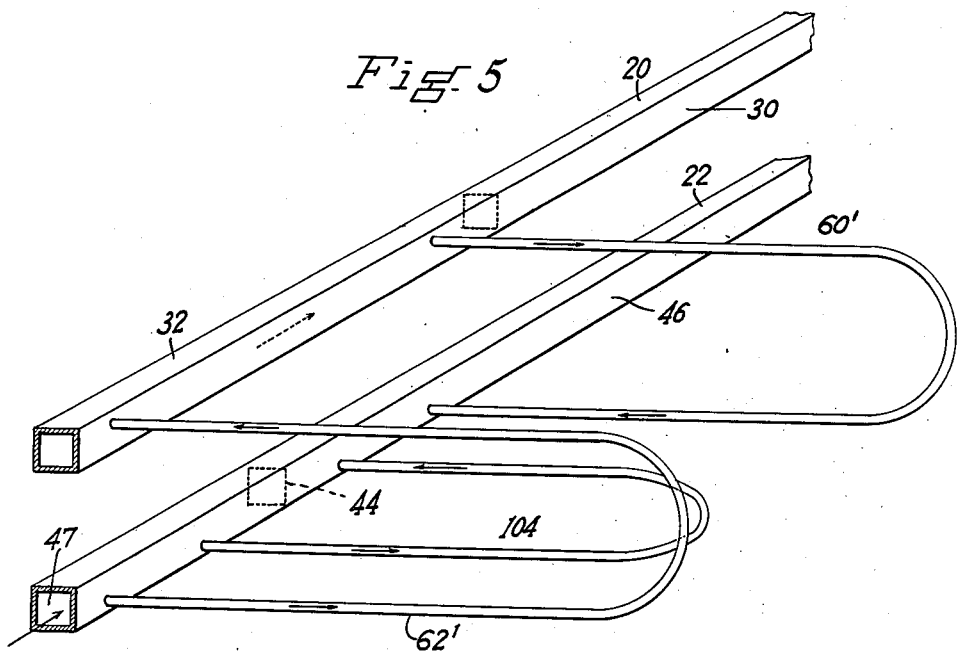
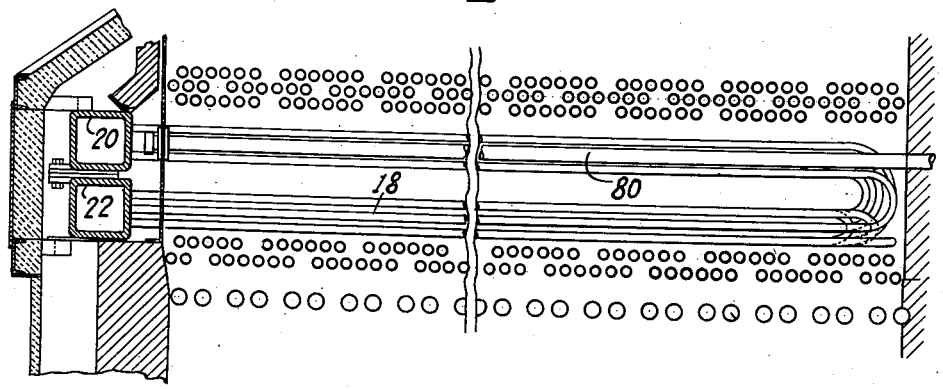

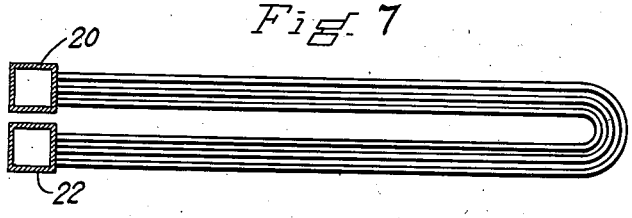
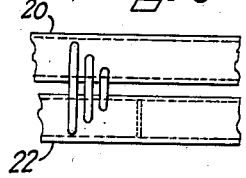
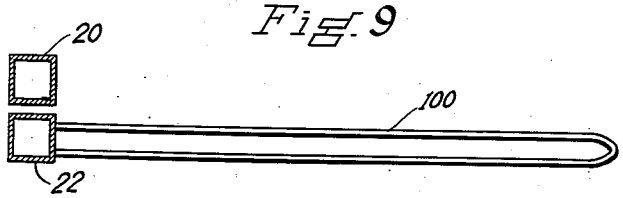
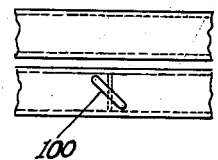
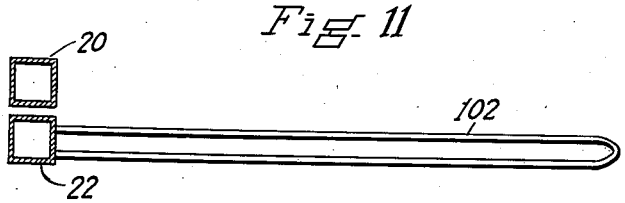
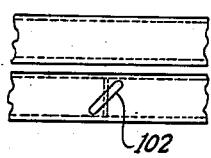
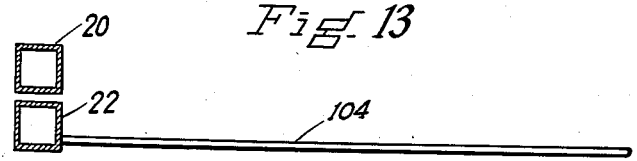
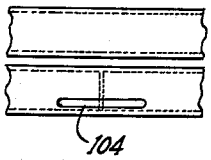
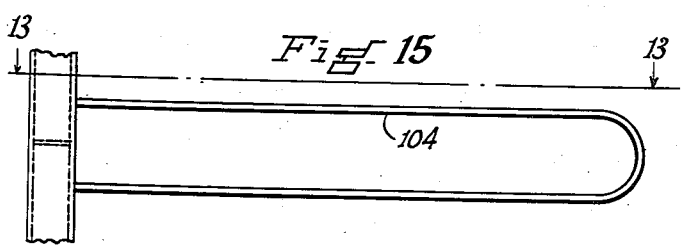

March 17, 1942.  M. MARTENSSON  2,276,326
FLUID HEAT EXCHANGE APPARATUS
Filed April 19, 1939   5 Sheets-Sheet 5

INVENTOR.
Marten Martensson
BY
Rollin W. Holbrook
ATTORNEY.

Patented Mar. 17, 1942

2,276,326

UNITED STATES PATENT OFFICE 2,276,326

FLUID HEAT EXCHANGE APPARATUS

Marten Martensson, Washington, D. C., assignor to The Babcock & Wilcox Company, Newark, N. J., a corporation of New Jersey Application April 19, 1939, Serial No. 268,673

6 Claims. (Cl. 122—478)

This invention relates to fluid heat exchange apparatus and more particularly to such apparatus of the convection type in which an external fluid flows over spaced tubes in which there is a fluid at a different temperature.

The invention may be considered as exemplified in inter-deck superheaters employed in single pass marine boilers.

In many of such superheaters it has been found advantageous to use U-tubes connecting two headers, and to divide the tubes into groups arranged for a series flow of steam therethrough, by inserting partitions or diaphragms in one or both headers. In this way, for a given amount of heating surface, the flow path of the steam, and the velocity of the steam flow are desirably increased but limitations are imposed upon the spacing of the U-tubes. It is not possible to space the tube seats along a header at the partition locations as closely as elsewhere, and hence there will be zones of lower gas flow resistance at such locations. The furnace gases (or other fluid) may flow at higher velocity through such zones of decreased flow resistance, and the mass flow may be higher than at other positions across the entire tube bank, with a consequent tendency to overheat the tubes in those zones. The present invention involves an arrangement of elements compensating for such increases in velocity or mass flow, and preventing such overheating.

Also, in such superheaters for marine boilers, and particularly where the superheater tubes are disposed at right angles to the steam generating tubes, it is important that the installation be compact. This calls for the disposition of soot blowers within the superheater space between rows of steam generating tubes, and superheater tubes must be omitted to provide for the soot blower tubes and the necessary spaces around them. Here again there are conditions setting up zones of lower gas flow resistance with their tendency to cause overheating of the adjacent superheater tubes. The invention also affords a remedy for such undesirable conditions.

The invention will be described with reference to the attached drawings, and other objects of the invention will appear in the description.

Fig. 2 is a view in the nature of a partial side elevation showing the groups of superheater tubes. This view is taken in the direction of the arrows from the line 2—2 of Fig. 3;

Fig. 3 is a vertical section taken on a plane parallel to the superheater tubes and transverse to the boiler tubes;

Fig. 4 is a detail sectional view on the line 4—4 of Fig. 3 showing a part of the structure indicated in Fig. 2;

Fig. 5 is a diagrammatic view illustrating an embodiment of the invention wherein there are convection heated tubes providing long and short flow paths through convection heated tubes for steam from a header section on one side of a header partition to an adjoining section on the other side of that partition;

Fig. 6 is a view in the nature of a vertical section taken on the broken section line 6—6 of Fig. 2. This view shows soot blower tubes, and their arrangement with reference to the superheater tubes and steam generating tubes;

Figure 16:
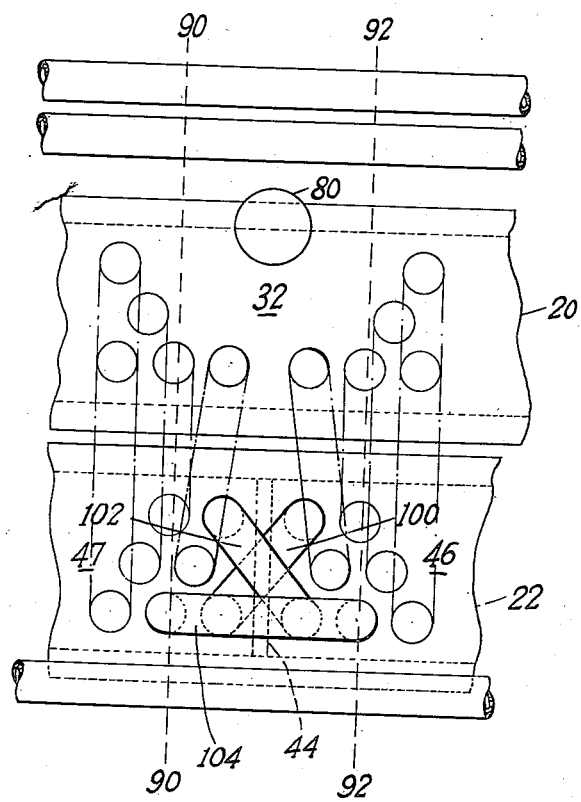

Figs. 7—15, inclusive, are diagrammatic views illustrating the invention;

Fig. 7 is a view showing a set of superheater tubes in elevation;

Fig. 8 is an end elevation of the structure indicated in Fig. 7;

Fig. 9 is a view of one of the bypass tubes with its inlet and outlet connected to the same header;

Fig. 10 is an elevation of the Fig. 9 structure indicating that the bypassing superheater tubes directly connect a header section on one side of a header partition to an adjoining header section on the other side of that partition;

Fig. 11 is an elevation of another bypassing superheater tube which is shown in Fig. 12 as connecting the above indicated header sections; Fig. 12, however, indicates that the Fig. 11 bypass tube is arranged in a plane substantially at right angles to the bypass tube shown in Fig. 9;

Fig. 13 is a side elevation indicating the lowermost bypass tube which, to a certain extent, encompasses the bypass tubes above referred to. This figure is partly a vertical section on the line 13—13 of Fig. 15;

Fig. 14 is an end elevation of the bypass tube arrangement indicated in Fig. 13;

Fig. 15 is a plan of the bypass tube arrangement indicated in Figs. 13 and 14; and Fig. 16 is a detail view showing on an enlarged scale the relationship of the bypass tubes to the adjacent U-tubes, the latter being indicated in dash lines.

Figure 1:
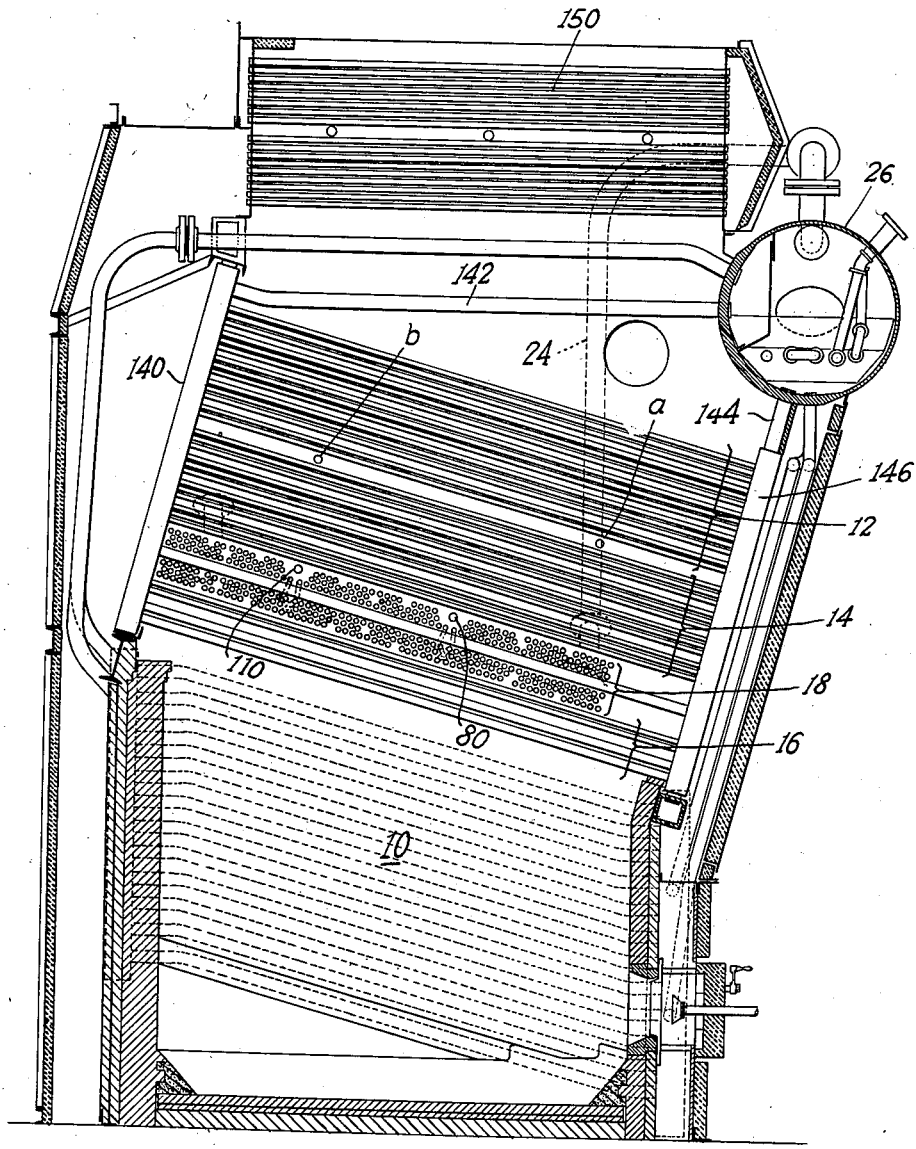
Fig. 1 is a vertical section of a steam generator particularly adapted for marine service.

The marine boiler indicated in Fig. 1 of the drawings involves a furnace 10 from which furnace gases pass over the groups of steam generating tubes 12, 14, and 16. The latter tube groups are so related as to provide space for the superheater which is indicated generally at 18, the superheater consisting, briefly, of spaced U-tubes having their ends connected to headers 20 and 22 which are shown in Figs. 2, 6, and 16. One of these headers is directly connected by the conduit 24 with the steam space of the steam and water drum 26 of the Fig. 1 boiler for supplying steam to the superheater.

The superheater header 20 is divided into sections 30, 32, 34, and 36 by diaphragms or partitions 37, 38, and 39, and the lower header 22 is similarly divided by the diaphragms 42 and 44 into the header sections 46—48.

Steam entering the header section 30 through the conduit 24 passes to the section 46 of the header 22 through the intermediacy of the U-tubes of the group 50, these tubes being arranged somewhat as are the U-tubes 52—54 of the Fig. 3 disclosure.

The section 46 of the lower header 22 extends laterally beyond the diaphragm 37, and this extension is connected by the U-tubes of the group 60 directly to the section 32 of the header 20. Similarly, the steam flows from the section 32 through the U-tubes of the group 62 to the header section 47 and thence through the U-tubes of the group 64 to the header section 34, this manner of series flow being continued through the groups of U-tubes 66 and 68 until the steam enters the exit header section 36. From that section it flows through the superheater steam conduit 70 to a point of use.

Between the groups 60 and 62 of the superheater tubes there is a transversely arranged soot blower tube 80, the latter being located generally in the superheater space, on account of the importance of space limitation in marine boiler installations. A transverse soot blower tube and the diaphragm header both result in the reduction in the amount of U-tube surface which can be connected to the headers in the immediate zone of their location. The soot blower tubes are positioned in planes common to and at positions above the diaphragms so that the most effective space utilization will be accomplished.

Referring to Fig. 1, it should be noted that by placing soot blowers 80 and 110 transversely of boiler tubes in positions provided by the omission of superheater tubes the height of the boiler is not increased as is the case when soot blowers are placed in positions between boiler tubes as *a* and *b* between spaced banks 12 and 14.

This arrangement of the soot blower tube 80 and the bypass tubes with reference to the diaphragm 44 and the adjoining tubular elements is more clearly shown in Fig. 16 where it will be seen that there is a considerable space between the soot blower tube and the immediately adjacent superheater tubes. This arrangement is necessary for efficient cleaning of the tubes by the jets of steam which are periodically caused to issue from longitudinally spaced nozzles along the soot blower tube 80; this necessity further has the effect of setting up a superheater zone in which the resistance to gas flow is very much decreased on account of the smaller number of superheater tubes in that zone. Such a zone of lowered gas flow resistance may be considered as the zone between the broken lines 90—90 and 92—92 of Fig. 16, and the presence of such zones across the superheater would result in the overheating of the tubes in those zones. This invention, however, provides an arrangement of elements which compensates for this overheating tendency and thus minimizes that source of damage to the superheater. This arrangement of elements includes the obliquely arranged bypass tubes 100 and 102 which are shown particularly in Figs. 9–12 of the drawings. It also includes the horizontally arranged bypass tube 104 which is arranged so as to partially encompass the bypass tubes 100 and 102. All of these bypass tubes directly connect the section 46 of the header 22 with the section 47 of the same header and they thus provide flow paths which are considerably shorter than the flow paths formed by the tubes of the groups 60 and 62 and the header section 32. As the pressure differential between sections of the headers on opposite sides of the diaphragm causes the flow through the tubes or serially connected pairs of tubes connecting them, the flow will be greater through the tubular flow path of the shortest length, the diameter of the tubes being the same. Thus the flow through the bypass tubes 100, 102, and 104 will be considerably more than that through the adjacent tubes, such as the groups 60 and 62. This will cause a greater rate of heat absorption per unit of tube surface in the bypass tubes and thus compensate for the tendency to overheat those tubes by reason of the smaller total amount of heating surface in the zones of lower gas flow resistance.

The relationship of the main flow paths and the bypass flow path is quite clearly indicated in a diagrammatic manner in Fig. 5. Here, steam enters the superheater section 47 and flows through the long U-tube 62' to the header section 32. Thence, it passes over a substantial portion of the length of the header 20 to the inlet of the long U-tube 60'. It passes through this tube to the header section 46 of the lower header 22.

In contrast to this long flow path through the U-tubes 62' and 60' is the short flow path from the header section 47 through the by-pass tube 104 directly to the header section 46, and when it is considered that the ends of the U-tube 104 are much nearer the diaphragm 44 than are the U-tubes 62' and 60', it will be seen that the by-pass flow path is much less than one-half of the main flow path through the U-tubes 62' and 60'. The by-pass flow path is much smaller proportionately when the U-tube 104 is of a length less than the length of either one of the main U-tubes 62' and 60'.

It will be understood that the arrangement of elements above described may be repeated at a plurality of positions across the entire superheater, the drawings showing another similar arrangement of elements which may be considered as centered around the soot blower tube 110.

As indicated in Fig. 3 of the drawings the superheater tubes may be supported by plates 120 and 122 apertured so that the superheater tubes may extend therethrough. These plates are in turn supported by the large diameter steam generating tubes 124—127 and the plates are arranged in good heat exchange relationship with the latter tubes in order that overheating of the plates may be prevented.

Referring briefly again to the boiler shown in Fig. 1 of the drawings the steam generating tubes at their upper ends are indicated as connected to uptake headers 140, the steam and water discharging through these headers to horizontal circulators 142 and thence to the drum 26. From the water space of this drum nipples 144 extend downwardly to the downtake headers 146 which are directly connected to the inlet ends of the steam generating tubes. Above the steam generating tubes there is an air heater 150.

The expression "gas mass flow" as used herein is considered as meaning the weight of gases flowing over a unit of area per unit of time.

What is claimed is:

1. In a superheater, headers, a bank of spaced U-tubes connected to the headers and arranged in groups transversely of gas flow, the spacing of the tubes within each group being uniform and less than the spacing of the groups transversely of gas flow, means whereby the groups of U-tubes are connected for series flow of steam therethrough from group to group, and by-pass tubes extending across gas flow adjacent the spaces between the groups and arranged so as to cause steam to by-pass some of the U-tubes in order that overheating tendencies adjacent the junctions of the groups may be overcome by increased heat absorption by the by-pass tubes.

2. In a water tube steam boiler, spaced banks of steam generating tubes, a superheater including a plurality of headers, a partition dividing one of the headers into sections, groups of spaced superheater tubes joining the headers and disposed transversely across a gas pass between said banks of steam generating tubes, the tubes and the partition being arranged for series flow of steam from group to group, the superheater tubes being less in number per unit of header length at a position adjacent the partition, said arrangement of superheater tubes affording a pocket for a soot blower tube, and a by-pass tube extending across the gas pass and directly joining a header section on one side of a partition to the adjoining header section on the other side of the said partition.

3. In a fluid heater, two headers, means forming a gas pass, U-tubes joining the headers and extending across the gas pass, said tubes being spaced along the headers and arranged in spaced groups with the spaces between the groups greater than the gas flow spaces between the tubes of a group, means whereby a fluid is caused to flow in series from group to group through the tubes of a plurality of said groups, and shorter tubes connected across adjacent groups so as to have flow capacities per unit of heat absorbing ability greater than those of the U-tubes and disposed in the spaces between said groups.

4. In a fluid heater, two headers, means forming a gas pass, U-tubes joining the headers and extending across the gas pass, said tubes being spaced along the headers and arranged in spaced groups with the spaces between the groups greater than the gas flow spaces between the tubes of a group, a diaphragm extending transversely of one header at a position between two adjacent groups of said tubes so as to divide that header into an inlet section and an outlet section, most of the internal fluid passing from the inlet section to the other header and thence through the tubes of another group to the outlet section, and a tube directly connecting the inlet and outlet sections and disposed in the gas flow space between said groups.

5. A superheater comprising a plurality of series connected groups of tubes through which steam flows in a plurality of passes across a gas pass, the tubes being so spaced and arranged that the gas mass flow is non-uniform transversely the gas pass and that there are zones of greater gas mass flow between the groups of tubes, and additional tubes having flow capacities per unit of heat transfer ability greater than those of the first mentioned tubes, the additional tubes being disposed across the gas pass and in said zones of greater mass flow, said grouped tubes being arranged for parallel steam flow through the tubes of each group with the groups connected for series steam flow.

6. In a water tube steam boiler adapted for marine installations, groups of steam generating tubes extending across a gas pass and spaced apart in the direction of gas flow, spaced soot blower tubes in the space between said groups, a superheater in said space and having tubes disposed in groups between the soot blower tubes, means connecting successive groups of superheater tubes for the series flow of steam therethrough, the spacing between the soot blower tubes and the adjacent superheater tubes being greater than the spacing of the superheater tubes in their groups and thereby creating zones of greater mass flow adjacent the soot blower tubes, and by-passing superheater tubes having flow capacities per unit of heat transfer ability greater than the remainder of the superheater tubes, said by-passing tubes being disposed across the gas pass and in said zones of greater mass flow.

MARTEN MARTENSSON.